(12) United States Patent
    Mack

(10) Patent No.: US 6,192,044 B1
(45) Date of Patent: *Feb. 20, 2001

(54) EMPLOYING A LOOK-UP SERVICE AND A CALLEE CONNECTION SERVICE TO ESTABLISH A NETWORK PHONE CALL BETWEEN A CALLER AND A CALLEE

(75) Inventor: Walter Mack, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/829,608

(22) Filed: Mar. 31, 1997

(51) Int. Cl.[7] .................................................. H04L 12/66
(52) U.S. Cl. ........................ 370/352; 370/356; 370/401; 379/202; 379/220
(58) Field of Search ........................ 379/88, 89, 90.01, 379/201, 202, 207, 220; 370/259, 260, 401, 352, 353, 354, 355, 356, 357, 380, 463

(56) References Cited

U.S. PATENT DOCUMENTS 5,724,412 * 3/1998 Srinivasan ............................ 379/90
5,726,984 * 3/1998 Kubler et al. ........................ 370/349
5,850,433 * 12/1998 Rondeau .............................. 379/201

FOREIGN PATENT DOCUMENTS

WO 96/20553 * 4/1996 (WO) .

OTHER PUBLICATIONS

Yang, "RFC 1789: INETPhone: Telephone Services and Servers on Internet", IETF, pp 1–5, Apr. 1995.*

* cited by examiner

Primary Examiner—Chi H. Pham
Assistant Examiner—Frank Duong
(74) Attorney, Agent, or Firm—Blakeley, Sokoloff, Taylor & Zafman LLP

(57) ABSTRACT

The invention includes to establishing a network phone call connection between a caller and a callee. The network includes a caller connected to the network through a first network access provider. The callee is connectable to the network through one of a first or a second network access provider. A network phone call connection between the caller and callee may be established by creating a look-up service and a callee connection service. Subsequent to the creation of the look-up service and the callee connection service, the invention determines whether the callee is connected to the network. If yes, a network phone call connection to the callee is established. If no, the look-up service and callee connection service is employed to connect the callee to network. Then, once this is done, a network phone call connection to the callee is established.

12 Claims, 8 Drawing Sheets

EMPLOYING A LOOK-UP SERVICE AND A CALLEE CONNECTION SERVICE TO ESTABLISH A NETWORK PHONE CALL BETWEEN A CALLER AND A CALLEE

BACKGROUND OF THE INVENTION

1. Field of the Invention

The present invention relates to networks, and more specifically, to a method of establishing a network phone call connection between a caller and a callee that employs a look-up service and a callee connection service.

2. Description of the Related Art

People commonly employ the Internet for conducting an Internet phone call. The sequence of steps to conduct an Internet phone call is as follows. First, both parties connect to the Internet via their respective Internet service providers (ISP). Once both parties are connected to the Internet, an Internet phone call can be initiated by either party.

It is important to note that a requirement for initiating the Internet phone call is that both parties are presently connected to the Internet. This sequence of steps, described above, will hereinafter be referred to as the "rendezvous" model.

The "rendezvous" model has several disadvantages. First, since both the caller and the callee have to be connected to the Internet in order to initiate an Internet phone call, both participants of an Internet phone need to schedule a time for the call prior to the actual call, so that both participants, shortly before the call, can connect to the Internet. This option forces both parties to agree upon and set a time for the call in advance of the call itself. In other words, at least one communication, prior to the call, is needed to enable the "rendezvous" model. For example, consider the case where the caller is in Los Angeles, Calif. and the callee is in Paris, France. The caller and callee would need another means of communication (e.g., mail or regular telephone call) to establish the time of the Internet call. This option is burdensome and inefficient, especially if the Internet phone call is the preferred method of communication.

Second, the participants of an Internet phone call, if they do not determine in advance the time of the phone call, can hope that the other party is connected to the Internet in a hit or miss fashion. This option is very arbitrary and not recommended.

Clearly, both of these options are undesirable for the participants of an Internet phone call. Accordingly, their remains an unmet need for an improved method of establishing an Internet phone call that overcomes the disadvantages set forth above.

SUMMARY OF THE INVENTION

The invention includes to establishing a network phone call connection between a caller and a callee. The network includes a caller connected to the network through a first network access provider. The callee is connectable to the network through one of a first or a second network access provider. A network phone call connection between the caller and callee may be established by creating a look-up service and a callee connection service. Subsequent to the creation of the look-up service and the callee connection service, the invention determines whether the callee is connected to the network. If yes, a network phone call connection to the callee is established. If no, the look-up service and callee connection service is employed to connect the callee to network. Then, once this is done, a network phone call connection to the callee is established.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
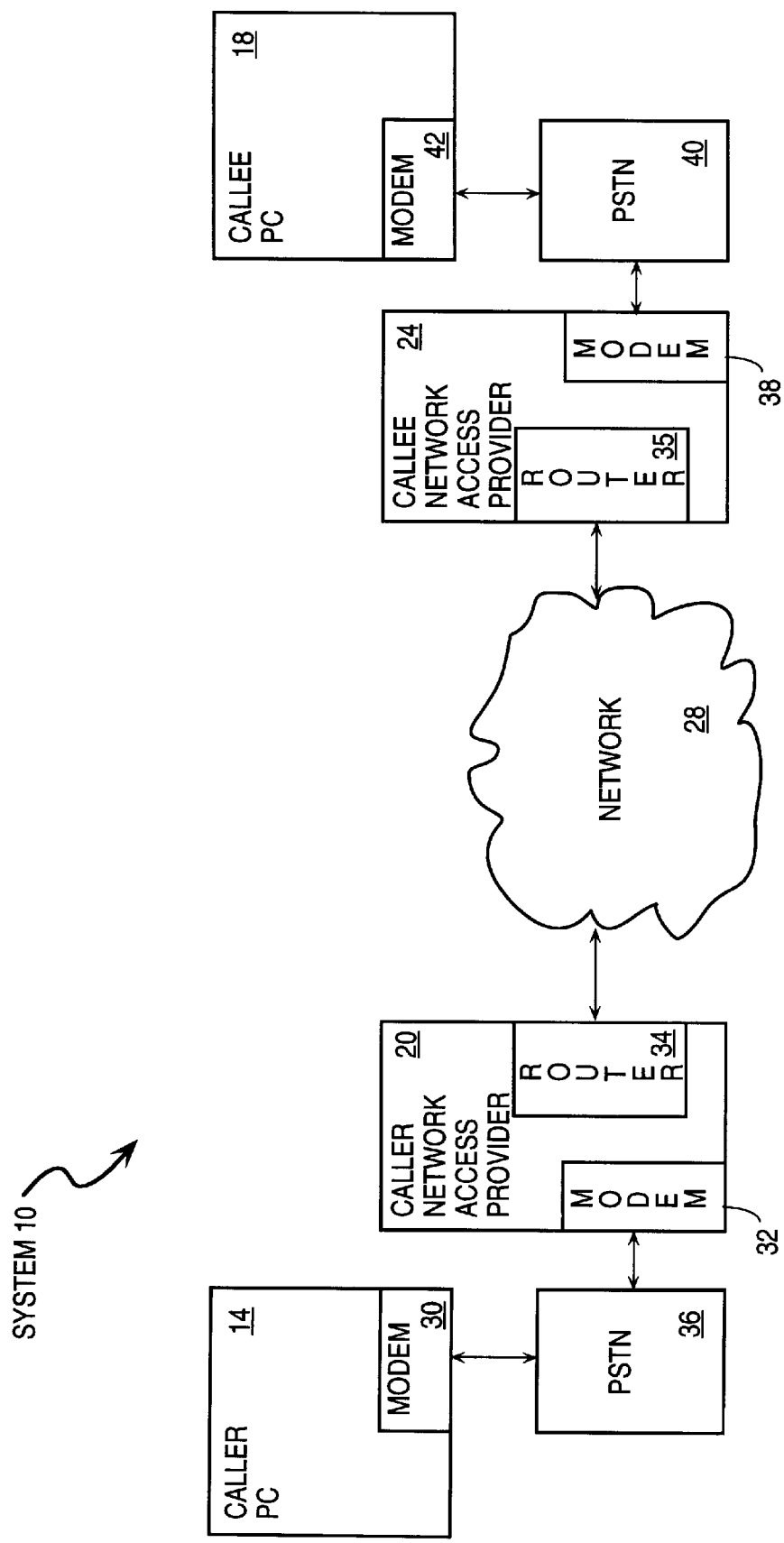
FIG. 1 illustrates a network in which the improved method for connecting two participants in a network telephone call can be implemented.

FIG. 1 illustrates a system 10 in which the improved method for connecting two participants in a network telephone call can be implemented. The participants of a telephone call (herein identified as the caller and the callee) each have a respective personal computer (PC) 14 and 18. The caller may be referred to as caller PC 14 or caller 14 and the callee may be referred to as callee PC 18 or callee 18. The caller PC 14 is configured with a modem 30 for interfacing with the plain old telephone system (POTS), also referred to as the public switched telephone network (PSTN) 36. The caller PC 14 accesses a network 28 through a caller network access provider 20. The network 28 can be the Internet. The caller network access provider 20 is configured with a modem 32 for interfacing with the PSTN 36. The caller network access provider 20 is also configured with a router 34 for interfacing with the network 28. The caller network access provider 20 can be an Internet service provider (ISP).

Although in this embodiment a personal computer (PC) is employed to connect the caller and the callee 18 to the network through the PSTN and respective network access providers, it will be known to those skilled in the art that any device that conforms to the requirements, as set forth in the network specifications for a network terminal device can be employed by the caller and the callee 18 to connect to the network. For example, a network computer (NC) that conforms to the network terminal device requirements can be employed by a caller or callee 18 to connect to the network through the PSTN and a network access provider.

Similarly, the callee has a callee PC 18, configured with a modem 42 for interfacing with the PSTN 40. The callee 18 accesses network 28 through a callee network access provider 24. The callee network access provider 24 is also configured with a modem 38 for interfacing with the PSTN 40 and a router 35 for interfacing with the network 28. The callee network access provider 24 can be an Internet service provider (ISP).

Although in the above-described example, the caller and the callee 18 employ a first and second network access provider, it will be understood by those skilled in the art that the first and second network access providers can be different ISP's or the same ISP.

Figure 2:
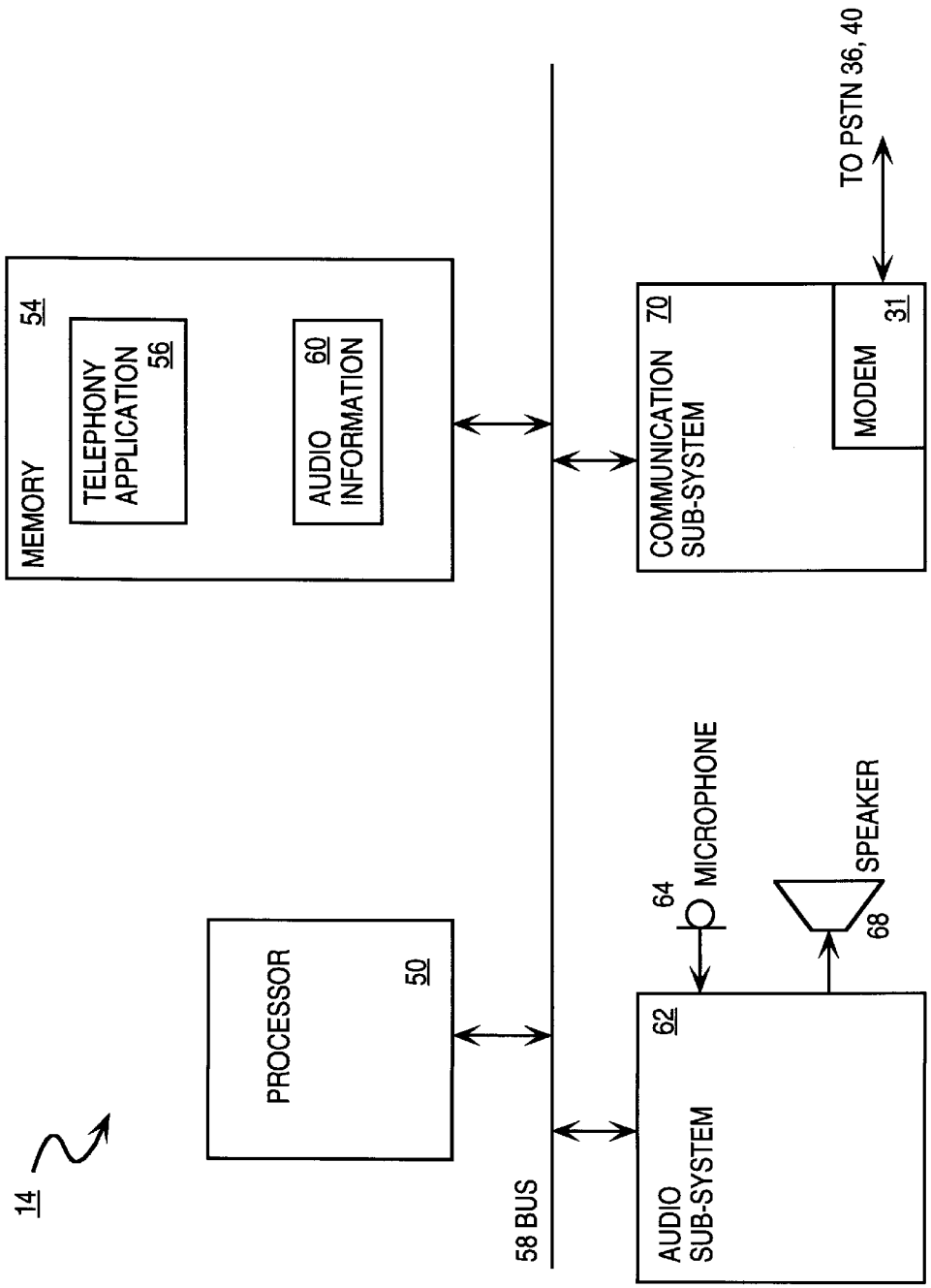
FIG. 2 is a simplified block diagram of a personal computer employed by the caller and the callee, as shown in FIG. 1.

FIG. 2 is a simplified block diagram of either a personal computer employed by the caller 14 (as shown) or a personal computer the callee 18 shown in FIG. 1. The personal computer 14 or 18 includes a processor 50 (e.g., Pentium™ processor available from the assignee of the present application), a memory 54 for storing data and software programs, an audio subsystem 62 for managing audio output and input, and a communication subsystem 70 for interfacing with the PSTN 36 or 40. The memory 54 may include telephony application 56 and audio information 60. The audio subsystem 62 includes a microphone 64 for receiving audio input and a speaker 68 for presenting audio output. All these elements are operatively coupled together through a bus 58. As noted previously, the communication subsystem 70 includes a modem 31 for interfacing with the PSTN 36 or PSTN 40. Modem 31 may be modem 30 or modem 42 and is configured to communicate data across the telephone network.

Figure 3:
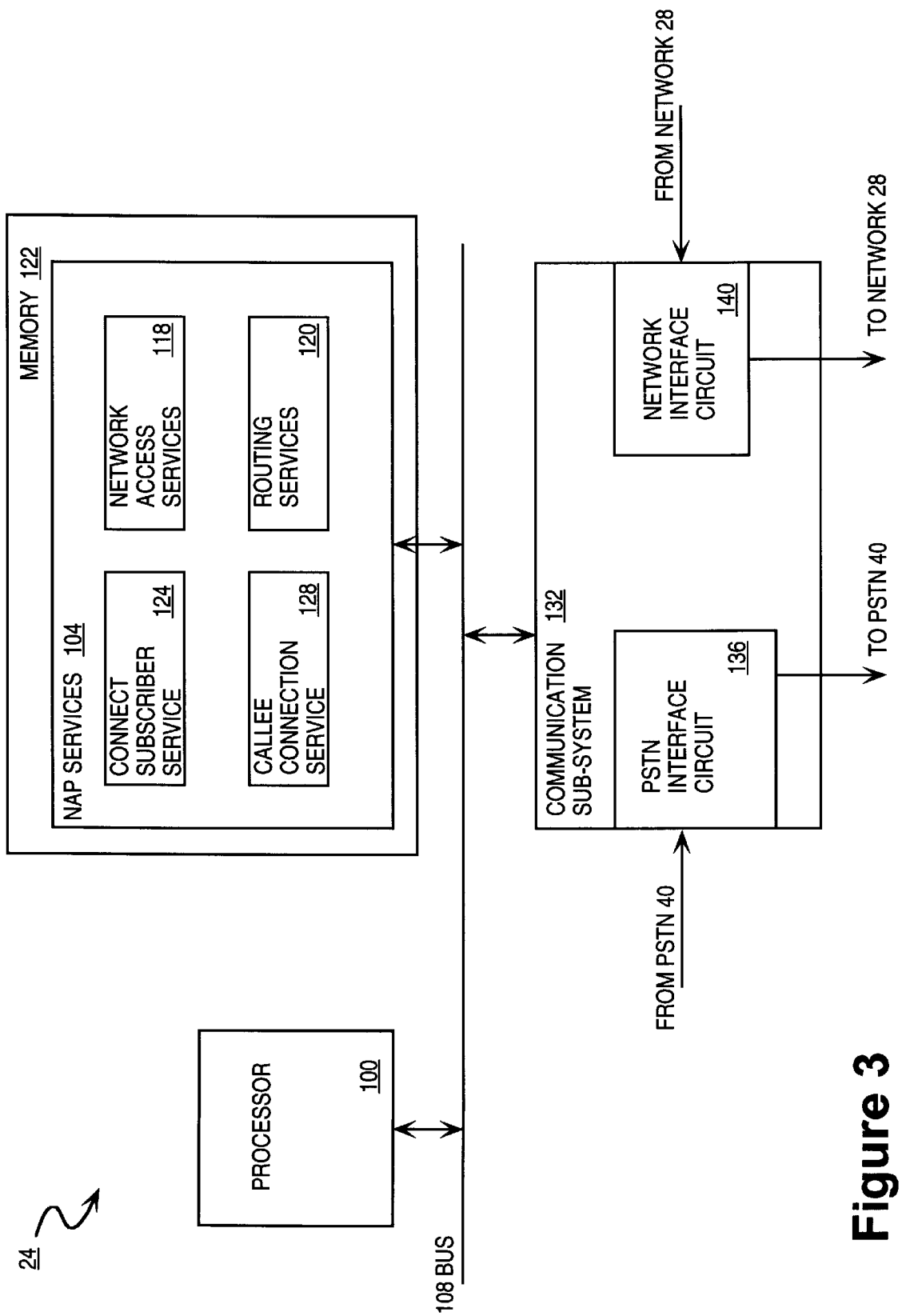
FIG. 3 illustrates a simplified block diagram of a network access provider, as shown in FIG. 1.

FIG. 3 illustrates a simplified diagram of a network access provider (e.g., caller network access provider 20 or the callee network access provider 24), as shown in FIG. 1. The network access provider 24 is a server having a processor 100, which can be a Pentium™ processor (available from the assignee of the present application), network access provider (NAP) services 104 that can be stored in memory 122, and a communications subsystem 132. The processor 100, the NAP services 104, and the communication subsystem 132 are operatively coupled to each other via a bus 108.

The NAP services 104 includes a connect subscriber service 124 for handling requests by subscribers to connect to the network. Network access services 118 are provided to connect and disconnect users to and from the network. A callee connection service 128 is a program that calls a subscriber's telephone number and initiates the login procedure with the callee 18 upon answering of the telephone call by the callee 18. The callee connection service 128 is an important piece of the present invention.

Routing services 120 control the routing of network packets that are received from the network by the network 28 access provider 24.

The communications subsystem 132 includes a telephone (on PSTN) interface circuit 136 and a network interface circuit 140. The telephone interface circuit 136 is configured to receive data from the telephone network (i.e., PSTN 36 or PSTN 40 of FIG. 1) and is configured to provide data to the telephone network. The network interface circuit 140 is configured to receive data from the network 28 and also to provide data to the network 28. The telephone interface circuit 136 can be implemented by a modem (30 or 32), and the network interface circuit 140, can be implemented by a router (34 or 38).

Typically, the telephone interface circuit 136 (e.g., a modem) in a network access provider is not employed to call subscribers. However, the present invention employs the callee connection service 128 to direct the PSTN interface circuit 136 to call a subscriber when the callee connection service 128 is provided with the telephone number of the subscriber, and a request for connection by a caller. The specific steps performed by the callee connection service 128 will be described in greater detail hereinafter with reference to method steps of FIG. 8.

Figure 4:
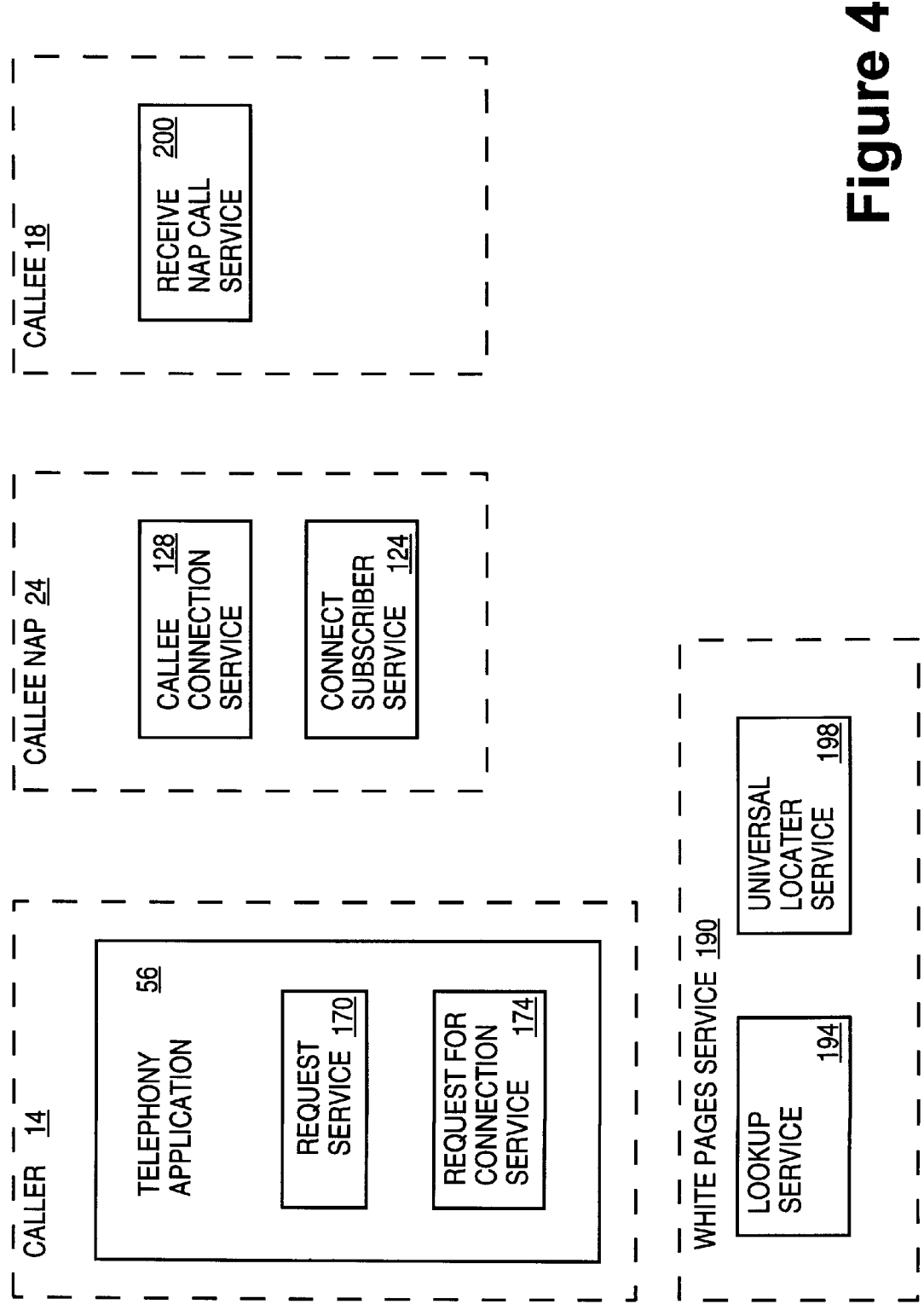
FIG. 4 illustrates a simplified block diagram of various software applications configured according to one embodiment of the present invention.

FIG. 4 illustrates a simplified block diagram of various software programs that are configured in accordance with one embodiment of the present invention. FIG. 4 illustrates a caller 14, a callee 18 who is not currently connected to the network, a network access provider associated with a callee 18 and identified as callee NAP 24, and a white pages service 190. In this example, the caller 14 is the caller that desires communication with the callee 18. As shown in both FIG. 2 and FIG. 4, the caller 14 includes a telephony application 56 for enabling telephone calls through the network. The telephony application 56 includes a request service application 170 and a request for connection service application 174. The request service application 170 queries the look-up service 194 for the telephone number of the callee 18. The look-up service 194 may be hosted by a white pages service 190. The request service application 170 also queries the look-up service 194 for the network address of the callee NAP 24. The telephony application 56 also includes a request for connection application 174 that sends a request for connection to the callee network access provider 24.

The white pages server 190 includes a lookup service application 194 and a universal locator service 198. The universal locator service 198 is a service that provides an network or Internet Provider (IP) address corresponding to a person who is identified by an identifier, and is well known in the art.

The lookup service 194 and the callee connection service 128 do not exist in the prior art, and are important services provided by and employed by the present invention. The lookup service 194 and the callee connection service 128 are described in greater detail in FIG. 7 and FIG. 8, respectively.

The callee network access provider 24 includes a callee connection service application 128 and a connect subscriber service application 124. As noted previously, the connect subscriber application 124 is well known in the art and is employed to connect subscribers to the network through the network access provider. Customarily, this is known as the login procedure for subscribers to connect to the network.

The callee connection service 128 is unknown in the prior art, and in response to the connection request from the caller 14, the callee connection service 128 places a telephone call to the callee 18.

The callee 18 includes a receive network access provider (NAP) call service application 200 that identifies that a phone call originates from a network access provider and distinguishes those calls from an ordinary phone call. For example, in one embodiment, a combination of hardware and software is available at the callee 18 to detect a distinctive ring for calls that originate from the callee network access provider 24. In another embodiment, a combination of hardware and software can identify the caller ID between the first and second rings and compare that caller ID to the caller ID of the callee network access provider 24. If there is a match, the application 200 notifies the user by a message on the screen of callee PC 18 or by an audio indicator 68 (FIG. 2) that a caller 14 is requesting that the callee 18 connect to the network 28 and complete a network telephony connection. Alternatively, application 200 can automatically instruct the callee PC 18 to initiate login procedures and connect to the network 28.

Before employing a look-up service such as look-up service 194 of FIG. 4, the caller 14 verifies whether or not the callee 18 is connected to the network 28 by employing a universal locator service 198. If it is determined from the universal locator service 198 that the callee 18 is not connected to the network 28, the present invention employs the look-up service 194, described hereinafter with reference to FIG. 7, and the callee connection service 128, described hereinafter with reference to FIG. 8, to establish a network telephony connection between the caller 14 and the callee 18.

Figure 5:
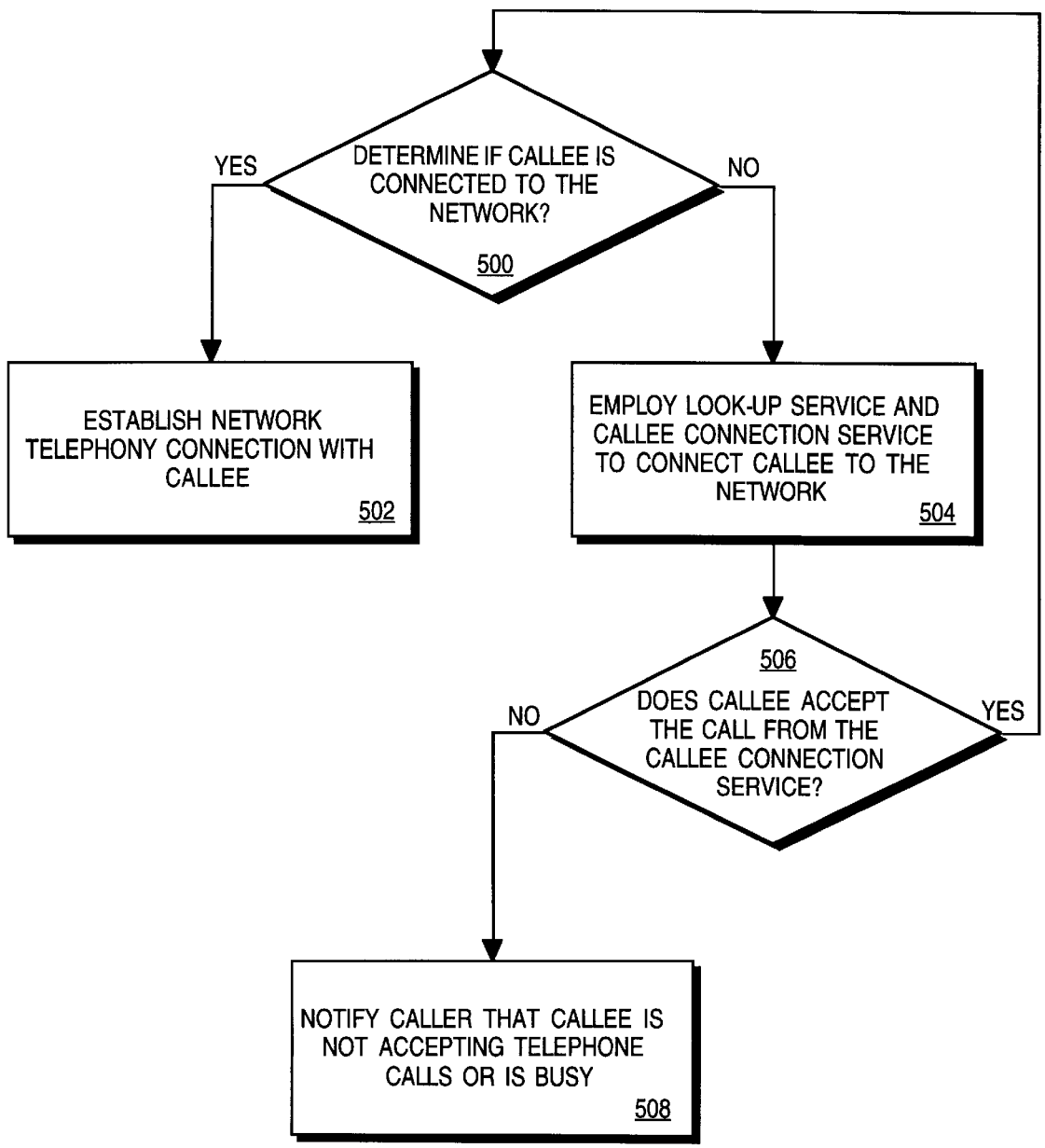
FIG. 5 is a flowchart illustrating a method of establishing a network phone call connection between a caller and a callee in accordance to one embodiment of the present invention.

FIG. 5 is a flowchart illustrating a method of establishing a network phone call connection between a caller 14 and a callee 18 in accordance to one embodiment of the present invention. In step 500, a determination of whether the callee 18 is connected to the network 28 is made. For example, a caller 14 can employ a universal locator service (ULS) 198 to determine if the callee 18, whom the caller 14 wants to call, is currently connected to the network 28.

If yes, in step 502, the telephony application 56 of the caller 14 establishes a network telephony connection with the callee 18. For example, the telephony application 56 of the caller 14 can query the universal locator service 198 for the machine address of the callee 18. Thereafter, the telephony application 56 can employ the machine address of the callee 18 to establish a network phone call connection with the callee 18 by employing conventional techniques.

If no, in step 504, the telephony application 56 of the caller 14 employs the look-up service 194 and callee connection service 128, introduced by the present invention, to connect the callee 18 to the network 28.

In step 506, a determination is made whether or not the callee 18 accepts the call from the callee connection service 128. If yes, the processing continues at decision block 500. If no, the processing continues to step 508.

In step 508, the caller 14 is notified that the callee 18 is not accepting calls.

As is known in the art, packets that travel in a network such as the network FIG. 1 include a header that, at a minimum, includes a destination network address and an origination network address. These network addresses specify a particular machine in the network. In the case of the Internet, these network addresses are commonly referred to as IP addresses.

As a packet travels through the network, the routers examine the destination IP address at each of the network access providers and forward the packet if the destination address does not match the network access provider's own address. The IP address of a network access provider callee (also known as the subscriber or user) may be assigned to the callee PC 18 by the callee network access provider 24 on a per-session basis, where a session begins with a user login and ends with a user logout. In other words, an ISP would dynamically assign an IP address to each of its subscribers upon log-in. Once the address of the callee PC 18 is established, the network access provider or ISP is simply a router that routes a packet directed to the machine.

Figure 6:
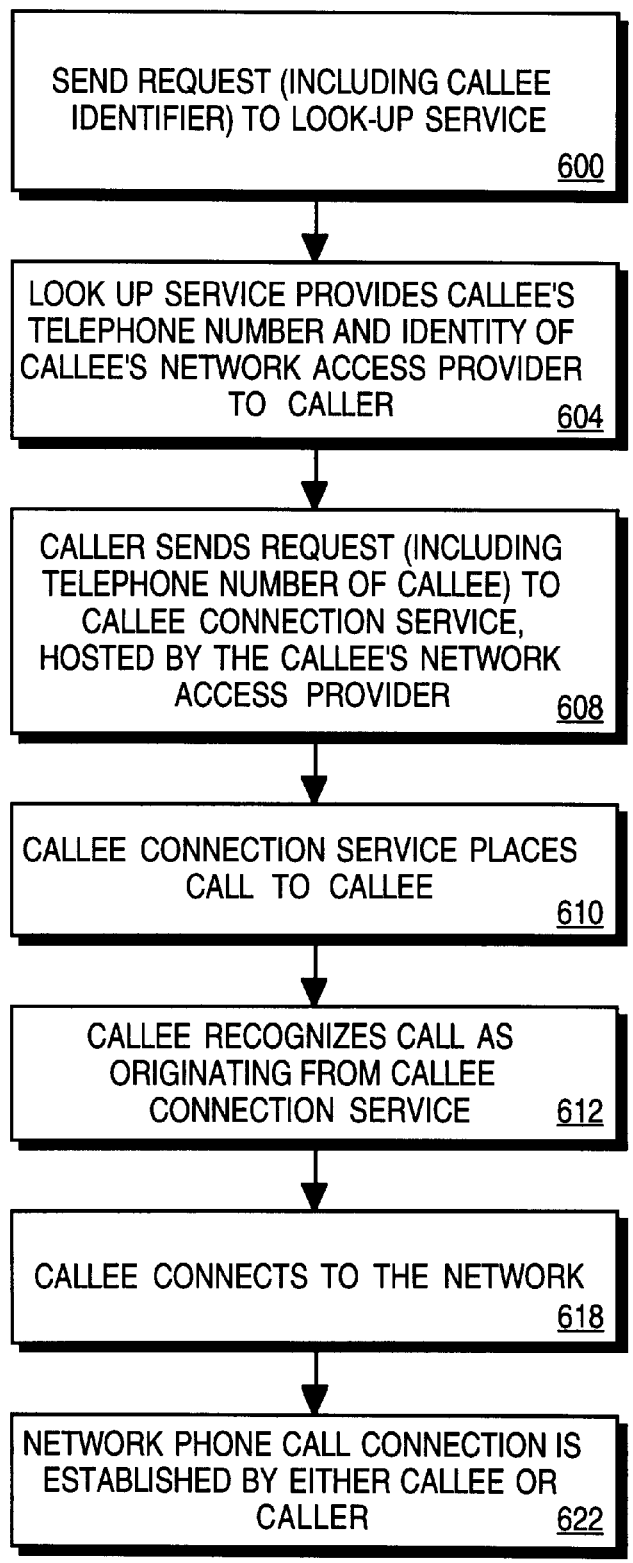
FIG. 6 is a flowchart illustrating in greater detail the method illustrated in FIG. 5.

FIG. 6 is a flowchart illustrating in greater detail the method illustrated in FIG. 5. In step 600, a caller 14 sends a request to the look-up service 194. This request includes a callee identifier corresponding to the callee 18. In step 604, in response to the request, the look-up service 194 provides to the caller 14 the telephone number of the callee 18 and the identity of the callee network access provider 24. For the Internet, the identity of a network access provider is simply its domain name.

In step 608, the caller 14 sends a request to the callee connection service 128 hosted by the callee network access provider 24. This request includes the telephone number of the callee 18. In step 612, in response to the caller's request, the callee connection service 128 places a telephone call (i.e., a PSTN call) to the callee 18.

In step 618, the callee 18 recognizes that the call originated from the callee network access provider 24. For example, a call originating from the callee network access provider 24 can have a distinctive ring, a specific caller identification, or the callee 18 can have a dedicated phone number specifically set aside for the callee network access provider 24. In other words, there is hardware or software (e.g., a PSTN telephony application 56) in the callee's PSTN access arrangement (e.g., callee PC 18) that distinguishes calls from the callee connection service 128 and all other phone calls. In step 620, the callee 18 connects to the network 28 through the callee network access provider 24. Once the callee 18 is on-line, in step 622, a network telephony connection can be established by the caller 14. Alternatively, once the callee 18 is connected to the network 28, the callee 18 can also function as caller 14 for another network telephone call.

In one embodiment of the present invention, processing step 506 of FIG. 5 can occur between processing steps 618 and 620 of FIG. 6. Also, in one embodiment, steps 600–620 illustrate further details for processing step 504. Also, in one embodiment, processing step 622 is logically equivalent to step 502 of FIG. 5 if the caller 14 establishes the network phone call.

Figure 7:
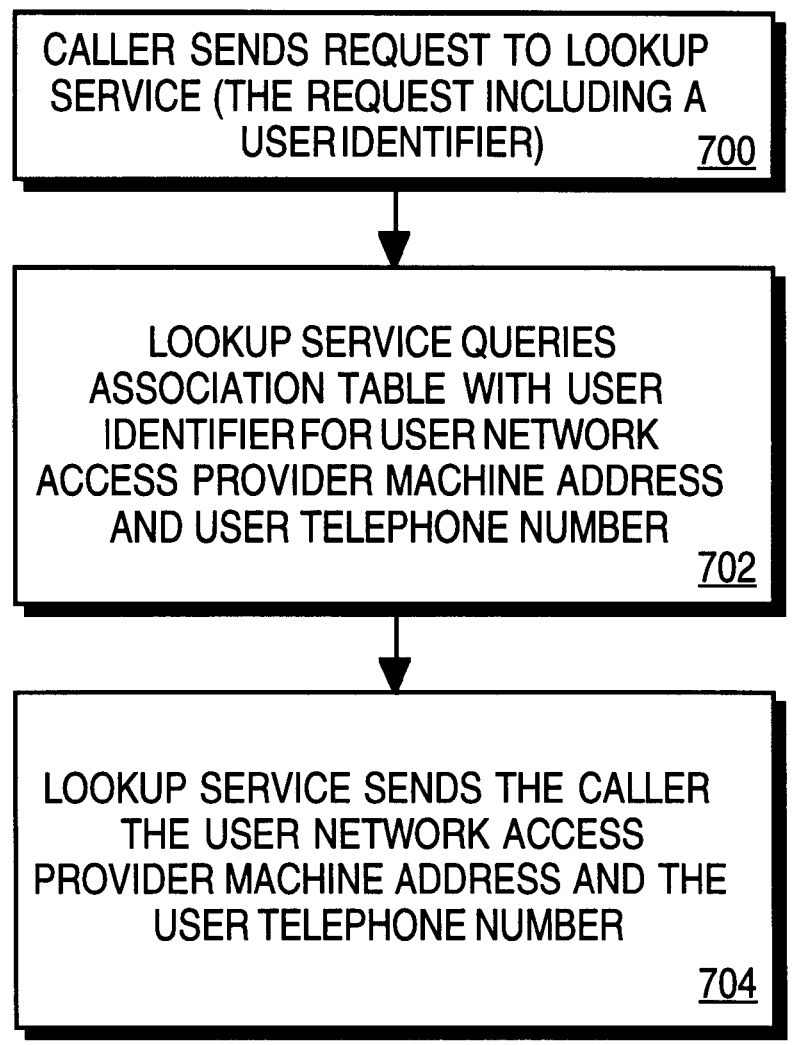
FIG. 7 is a flowchart illustrating the processing steps for the look-up service configured according to one embodiment of the present invention.

FIG. 7 is a flowchart illustrating the processing steps for a lookup service, in accordance with one embodiment of the present invention. In step 700, a caller 14 sends a request to a lookup server 194. This request includes a user identifier that is unique to the callee 18. For example, a user identifier can include a person's name, postal address, electronic mail address, social security number, and other commonly used identifiers. In step 702, the lookup service 194 queries an association table with the user identifier for a user network access provider machine address and also the user telephone number. In step 704, the look-up service 194 sends the caller 14 this user address and telephone number.

Figure 8:
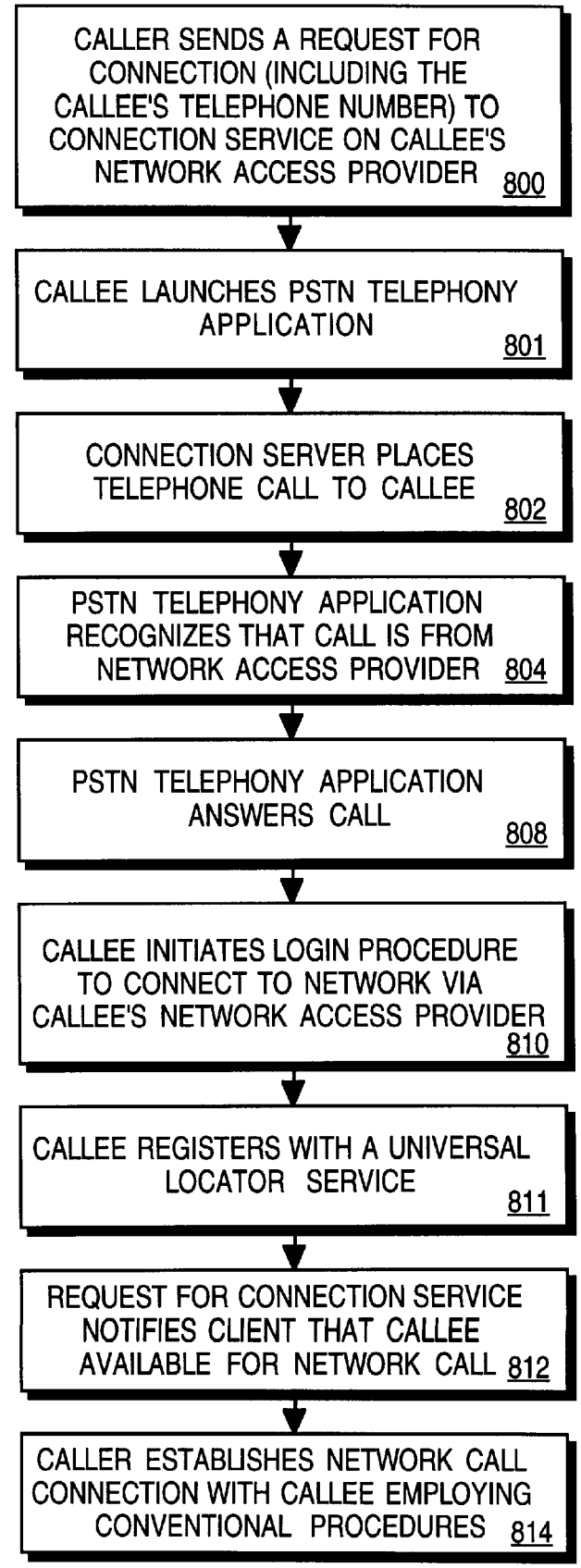
FIG. 8 is a flowchart illustrating the processing steps of the callee connection service configured according to one embodiment of the present invention.

FIG. 8 is a flowchart illustrating in greater detail the processing steps of the method of the present invention. The callee connection service 128 performs steps 802 and 812.

In step 800, the caller 14 sends a request for connection to the callee network access provider 24. The request for connection includes the callee's telephone number. The request for connection is sent by the request for connection application 174 to the machine identified as the callee network access provider 24. The callee network access provider 24 is identified by the NAP machine address of the callee 18.

In step 801, the callee 18 launches a PSTN telephony application 56. For example, when the callee personal computer 18 is turned on, the PSTN telephony application 56 can be launched automatically. The PSTN telephony application 56 monitors the telephone line and answers telephone calls based on predetermined conditions. In this case, the condition is that the callee network access provider 24 is calling. Step 801 can be performed at any time before step 802. Typically, step 801 is performed at power-up of the callee's computer 18.

In step 802, the connection callee service 128, which is hosted by the callee network access provider 24, places a telephone call to the callee 18.

In step 804, the PSTN telephony application 56 recognizes that the call is from a network access provider.

In step 808, the callee 18 answers the PSTN call.

In step 810, the callee 18 initiates log-in procedure to connect to the network access provider (e.g., ISP 24).

In step 811, the callee 18 registers with a universal locator service (ULS) 198. By registering with the universal locator service 198, the callee 18 indicates to other devices on the network 28 that the callee 18 is connected to the network 28 and also provides the machine address of the callee 18 to the network 28.

In step 812, the request for connection service 174 notifies the caller 14 that callee 18 now connected to the network 28.

In step 814, the caller 14 establishes a network call connection with the callee 18 by employing conventional procedures. In other words, establishing a connection with conventional procedures in step 814 refers to those standards and protocols for the Internet that have been established to govern telephone calls, video telephony and other data communications. The protocols for telephony, video telephony, and other data communications are specified in well known standards such as H.323, which is an International Telephony Union (ITU) standard.

Although the present invention has been described in the context of a caller requesting that a callee 18 connect to a network to enable a phone conversation via the network, it will be understood by those skilled in the art that the present invention can be employed whenever one user who is connected to the network desires that another user who is not connected to the network connect to the network for a particular purpose. This purpose may be for data transfer (e.g., through a file transfer protocol (FTP)), a remote log-in procedure, or for receiving electronic mail (e.g., SMTP mail).

Also, although the look-up service 194 has been described as being part of a white pages service 190, it will be understood that the look-up service 194 can be implemented in a separate server distinct from a universal locator service 198 or the white pages service 190.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
   presenting a look-up service;
   presenting a universal locator service;
   presenting a caller adapted to be coupled to and adapted to be connected with a network and adapted to be connected with the universal locator service and the look-up service;
   presenting a callee network access provider having a callee connection service, the callee network access provider adapted to be coupled to and adapted to be connected with the network, wherein the callee connection service is adapted to initiate log-in procedures with the callee to connect to the callee to the callee network access provider;
   presenting the callee adapted to be coupled to the callee network access provider;
   determining that the callee is not connected to the network by verifying that the universal locator service does not include a destination network address of a callee; and
   employing the look-up service and the callee connection service to establish a network phone call connection between the caller and callee, wherein employing the look-up service and the callee connection service to establish a network phone call connection between the caller and callee includes transmitting from the look-up service to the caller (i) a telephone number of the callee and (ii) an identity of the callee network access provider.

2. The method of claim 1, the callee network access provider further having a connect subscriber service, and wherein the callee network access provider does not include the look-up service.

3. The method of claim 1, wherein employing the look-up service and the callee connection service to establish a network phone call connection between the caller and callee includes employing the look-up service and the callee connection service to connect the callee to the network.

4. The method of claim 3, wherein connecting the callee to the network through the callee network access provider includes employing the callee connection service to initiate log-in procedures with the callee, the method further comprising:
   assigning the callee a destination network address; and
   registering the destination network address with a universal locator service.

5. The method of claim 3
   wherein employing the look-up service and the callee connection service to connect the callee to the network further includes
   employing the identity of the callee network access provider to transmit from the caller to the callee connection service a request to establish a network phone call connection between the caller and callee,
   in response to receiving the request to establish a network phone call connection between the caller and callee, transmitting a call from the callee connection service to the callee,
   determining whether the callee answers the call from the callee connection service, and
   if the callee does answers the call from the callee connection service, employing the callee connection service to initiate log-in procedures with the callee to connect to the callee to the callee network access provider.

6. The method of claim 5 wherein determining whether the callee accepts the call from the callee connection service includes determining at the callee whether the call from the callee connection service includes one of a distinctive ring and a specific caller identification.

7. The method of claim 5 wherein determining whether the callee accepts the call from the callee connection service includes determining at the callee whether the call from the callee connection service is to a phone number dedicated by the callee to receive only calls from the callee connection service.

8. The method of claim 5 wherein prior to transmitting from the look-up service to the caller (i) a telephone number of the callee and (ii) an identity of the callee network access provider, the method further comprising:
   receiving at the look-up service a callee identifier; and
   obtaining the telephone number of the callee and the identity of the callee network access provider by querying an association table with the callee identifier, wherein the association table is connected with the look-up service.

9. The method of claim 5, prior to transmitting a call from the callee connection service to the callee, the method further comprising:

launching a telephony application at the callee;

employing the telephony application to determine whether an call incoming to the callee is from the callee connection service; and if the telephony application determines that the incoming call is from the callee connection service, then answering the call at the callee.

10. A method comprising:

presenting a look-up service;

presenting a universal locator service;

presenting a caller adapted to be coupled to and adapted to be connected with a network and adapted to be connected with the universal locator service and the look-up service;

presenting a callee network access provider having a callee connection service and a connect subscriber service, the callee network access provider adapted to be coupled to and adapted to be connected with the network, wherein the callee connection service is adapted to initiate log-in procedures with the callee to connect to the callee to the callee network access provider;

presenting the callee adapted to be coupled to the callee network access provider;

determining that the callee is not connected to the network by verifying that the universal locator service does not include a destination network address of a callee; and employing the look-up service and the callee connection service to establish a network phone call connection between the caller and callee, wherein employing the look-up service and the callee connection service to establish a network phone call connection between the caller and callee includes transmitting from the look-up service to the caller (i) a telephone number of the callee and (ii) an identity of the callee network access provider, employing the identity of the callee network access provider to transmit from the caller to the callee connection service a request to establish a network phone call connection between the caller and callee, in response to receiving the request to establish a network phone call connection between the caller and callee, transmitting a call from the callee connection service to the callee, determining whether the callee answers the call from the callee connection service, and if the callee does answers the call from the callee connection service, employing the callee connection service to initiate log-in procedures with the callee to connect to the callee to the callee network access provider.

11. The method of claim 10 wherein determining whether the callee accepts the call from the callee connection service includes determining at the callee whether the call from the callee connection service includes one of a distinctive ring and a specific caller identification.

12. The method of claim 10 wherein determining whether the callee accepts the call from the callee connection service includes determining at the callee whether the call from the callee connection service is to a phone number dedicated by the callee to receive only calls from the callee connection service.

* * * * *